July 29, 1958     W. W. THOMAS     2,845,087
MODULATING REGULATORS
Filed Dec. 30, 1953

INVENTOR
WILLIAM W. THOMAS,

BY *Roland C. Rehm*

ATTORNEY

United States Patent Office 2,845,087
Patented July 29, 1958

2,845,087

MODULATING REGULATORS

William W. Thomas, Chicago, Ill., assignor to William Waterman, Evanston, Ill.

Application December 30, 1953, Serial No. 401,140

6 Claims. (Cl. 137—504)

This invention relates to a flow regulator for varying the rate of flow inversely as the pressure.

At predetermined minimum pressure, the regulator is designed to pass the maximum desired flow, and as the pressure increases the regulator responds to throttle flow to a degree sufficient progressively to decrease the rate of flow and maintain it at safe levels until under the maximum expected pressure, the rate of flow is at a predetermined minimum.

Figure 1:
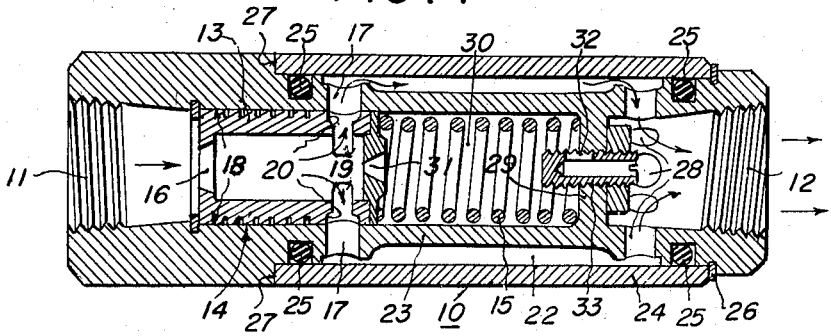
Fig. 1 is a longitudinal section through a regulator.

Conventional flow regulators theoretically function to maintain a uniform rate of flow despite variations in pressure. There are numerous instances, however, where entirely different operating characteristics are desired. One of the more important of these is regulation of the speed of an operating element inversely as the propelling force. In other words, the rate of flow is decreased as the fluid pressure increases. In hydraulic lifting or other rams, for example, the propelling force returning the ram varies as the load on the ram, and the safe speed at which the ram may be permitted to return depends on the load. When tightly loaded, or with no load, the ram may be safely permitted a much more rapid speed of return, yet in practice, such speed of return is actually substantially the same, at light and heavy loads.

A regulator embodying the present invention, when coupled in a line subject to variation in fluid pressure as in the return line from a ram cylinder or the like, is inversely responsive to return pressure, and therefore permits a greater rate of flow (in this case, a greater return speed) at low pressure than at high pressure. Rams of this character are generally single acting, and therefore have a single line leading to the head end of the ram cylinder to supply pressure to operate the ram and to carry away hydraulic fluid from the cylinder as the ram returns under its own load. The rate at which return flow passes through the line therefore determines the speed of return of the ram. For single acting cylinders of this character, the regulator also advantageously permits unrestricted flow in the opposite direction, i. e., to operate or fill the ram cylinder.

The regulator here shown comprises a hollow body 10 provided at its inlet end 11 and outlet end 12 with means (in this case threads) for coupling the same in the fluid line wherein the flow is to be regulated. A valve in the form of a piston 13 slidable in a cylindrical bore 14 in the regulator body is exposed to inlet pressure (return pressure in the case of a single acting ram) at the inlet end 11 of the regulator. A spring 15 functioning as presently explained, resists movement of the piston valve, which movement throttles flow through the regulator. Flow in the reverse direction (i. e. from port 12 to port 11) is unrestricted and unregulated.

As here shown, flow acts on the valve by passing through a metering orifice 16 designed to develop a small pressure drop sufficient under the conditions presently described, to move the valve against the resistance of spring 15. After passing orifice 16, flow discharges through ports 17 at which flow is throttled to the extent of movement of the piston. In this case throttling is effected by the piston skirt 18 which is adapted variably to cover outlet ports 17. In the present instance, the piston skirt is provided with openings 19 in the form of slots extending circumferentially of the skirt, through which flow passes to ports 17. The trailing edges 20 of the slots act to restrict the ports and thereby throttle flow. Spring 15 is advantageously pre-loaded to resist further compression until the pressure drop reaches the desired or predetermined value.

After passing through ports 17 flow reaches the outlet or discharge end 12 of the regulator through an annular passage 22 formed by the wall 23 of the regulator body and an outer cylindrical jacket or sleeve 24. The latter is sealed to the regulator body against leakage by seals in the form of O-rings 25 lying in grooves in the body, and is held in position by a snap ring fitting in a slot in the body immediately adjacent the end of the sleeve 24. The other end of the sleeve seats against a shoulder 27 on the regulator body. Adjacent the end of wall 23 are relatively large openings 28 by which flow from ports 17 reaches the outlet 12. Spring 15 is seated between the end of the piston skirt 18 and a wall 29 which closes the cylindrical space 30 inside the body wall 23.

The operation of piston valve 13 is modified in this instance to effect a progressive decrease in flow rate with increase in pressure, by supplementing the force on spring 15 to cause greater restriction of ports 17 than would occur in response solely to the pressure drop across orifice 16. As here shown, the pressure drop across a smaller supplemental orifice 31 also acts on spring 15 in a direction to increase the restriction of ports 17. Orifice 31 lies transversely to the axis of spring 15 and to the direction of movement of valve 13. In this instance it is embodied in a removable disk operatively bearing on spring 15 and located between the end of the spring and the piston skirt 18. Flow from orifice 31 passes through chamber 30 and joins the main stream after passing through a restricted orifice 32 in the wall 29 of chamber 30. Orifice 32 may be a fixed orifice, but, as here shown, is preferably adjustable, for it is this orifice which determines (as will presently appear), the maximum flow permissible at the maximum pressure. In the present instance, orifice 32 is embodied in a hollow plug 33 (closed at its leading end) threaded into the wall 29. The orifice itself is in the form of an elongated narrow slot extending longitudinally in the periphery of plug 39. The latter may be screwed in or out of wall 29 to vary the effective length of the exposed portion of the slot and therefore the effective size of orifice 32. The configuration of the orifice may of course be varied. An elongated narrow slot is advantageous because it increases the adjusting range and therefore permits closer adjusting.

At low pressures (when ports 17 are substantially unrestricted), the supplemental orifice has little effect, for the major flow passes through ports 17 and little through orifice 31, resulting in a negligible pressure drop in orifice 31, but as pressure increases, the pressure drop through orifice 16 causes throttling at ports 17, and the pressure drop across supplemental orifice 31 therefore increases at the expense of that across orifice 16. Such pressure drop coupled with the area of the disk surrounding orifice 31 and exposed to the pressure difference, now very considerably supplements the deflection of spring 15 and the consequent throttling at ports 17. Flow through the latter is thus decreased to an extent greater than it is supplemented by flow through restricted orifice 32. The result is that the flow rate through the regulator as a whole becomes less and less as the pressure increases.

In this connection it should be understood that the effective pressures to which the regulator is responsive, are actually pressure differences between inlet 11 and outlet 12. However, where the regulator discharges with substantially no back pressure, the effective pressure is practically that existing at inlet 11.

Figure 2:
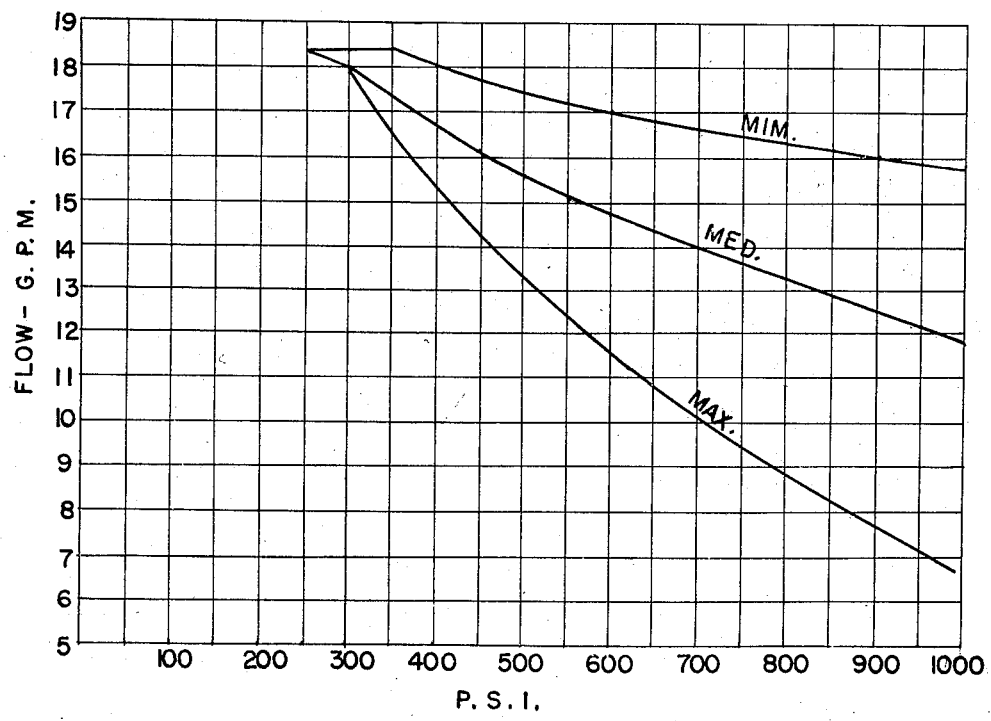
Fig. 2 is a chart illustrating the regulating characteristics of the device.

Fig. 2 graphically illustrates the regulation obtained in one type of regulator by three different adjustments of restricted orifice 32. With a minimum restriction of orifice 32, the flow varies from 18.5 gallons per minute (G. P. M.) at a pressure difference of 350 pounds per square inch (p. s. i.) to 15.7 G. P. M. at 1000 p. s. i. pressure difference. With the maximum practical restriction of orifice 32 flow is reduced from 18 G. P. M. at 300 p. s. i. to 6.5 G. P. M. at 1000 p. s. i. An intermediate adjustment reduces flow from 18 G. P. M. at 300 p. s. i. to 11.8 G. P. M. at 1000 p. s. i. It should be noted that the restriction of orifice 32 determines the maximum permissible flow through the regulator at the maximum pressures, i. e. when orifice 17 is closed or substantially closed. In the case of a ram this determines the maximum safe speed of return at maximum load.

In the regulator whose operation is illustrated in Fig. 2 the relation between pressure and flow rate may for practical purposes and within the critical ranges, be considered substantially a linear relationship.

The following is a typical example of the adaptation of a regulator to a minimum flow rate of 5 G. P. M. at 1000 p. s. i. pressure difference and 10 G. P. M. at 200 p. s. i.

The spring 15 restraining the piston is calculated to balance the force on the piston caused by the small pressure drop occurring across orifice 16, that being selected for the present illustration as 50 p. s. i. Since a slight flow through ports 17 is desirable at maximum pressure for purposes of stability, the restricted orifice 32 is selected to pass 3 G. P. M. at 1000 p. s. i. pressure difference. This should be added to a flow of 2 G. P. M. passing ports 17 with maximum restriction, making a total flow of 5 G. P. M. At 200 p. s. i. orifice 32 will pass 1.34 G. P. M., i. e.

$$\frac{\sqrt{200}}{1000} \times 3 \text{ G.P.M.}$$

The secondary orifice 31 is calculated to pass 3 G. P. M. at 43 p. s. i. for a trial calculation, and the main orifice 16 is selected to pass 5 G. P. M. at 7 p. s. i. Thus at 1000 p. s. i. the total pressure drop is 7+43=50 p. s. i. which balances the spring force and causes the specified 5 G. P. M. flow. The total flow is 5 G. P. M. all of which passes through the main orifice 16. 2 G. P. M. passes through port 17 and 3 G. P. M. passes through the secondary orifice 31 and the restricted orifice 32.

To check conditions at 200 p. s. i., the pressure drop at the main orifice 16 is checked at 10 G. P. M. and found to be 38 p. s. i. The secondary orifice checks at 1.35 G. P. M. at 12 p. s. i. The total pressure drop across the main and secondary orifice is thus 38+12=50 p. s. i., which causes the flow to be regulated at the specified 10 G. P. M. at 200 p. s. i. pressure difference across the regulator. The flow rate—pressure characteristic of the regulator is substantially linear and may be represented by a straight line of the desired slope, see Fig. 2.

Obviously the invention is not limited to the details of the illustrative regulators, since these may be variously modified. Moreover it is not indispensible that all features of the invention be used conjointly since various features may be used to advantage in different combinations and sub-combination.

Having described my invention, I claim:

1. A flow regulator of the character described comprising in combination a valve housing having inlet, outlet and a cylindrical fluid passage connecting inlet and outlet and provided with a port, a piston valve exposed to the forces of fluid slidable in said passage and adapted to throttle said port to control the rate of flow, said piston having therein a metering orifice through which the flow passes to reach said port, said orifice being only slightly restricted to produce only enough pressure drop to actuate said valve, a spring resisting the movement of said valve, an auxiliary passage by-passing said port, said piston valve having a small supplemental orifice to admit a small flow to said auxiliary passage arranged transversely to the direction of movement of said valve and adapted to produce a substantial pressure drop acting on said piston valve to supplement the pressure drop through said metering orifice and thereby to increase the throttling action of said valve and reduce the rate of flow through said regulator as the fluid pressure increases.

2. A flow regulator of the character described comprising in combination a valve housing having inlet, outlet and a cylindrical fluid passage connecting inlet and outlet and providing with a port, a piston valve exposed to the forces of fluid flow slidable in said passage and adapted to throttle said port to control the rate of flow, said piston having therein a metering orifice through which the flow passes to reach said port, said orifice being only slightly restricted to produce only enough pressure drop to actuate said valve, a spring resisting the movement of said valve, and a small supplemental orifice in said piston communicating with said outlet and inlet and by-passing said throttling port and arranged to produce a supplemental pressure drop on said valve further to deflect said spring, the supplemental orifice being so restricted that the aggregate flow through both said orifices decreases as fluid pressure increases.

3. A flow regulator of the character described comprising in combination a valve housing having inlet, outlet and a fluid passage communicating with inlet and outlet, said passage having a port, a piston valve exposed to the forces of fluid flow slidable in said housing and adapted to throttle said port, said valve having an orifice of substantial size upstream of said port through which said flow passes to produce a small pressure drop for actuating said valve to throttle said port, a spring resisting movement of said valve, and a small supplemental port in said valve communicating with said inlet and outlet through which a small portion of the flow passes to said outlet, said supplemental port being restricted to produce a substantial pressure drop with relatively small flow to supplement the force on said valve thereby to increase the deflection of said spring and further reduce the rate of flow through said regulator as the pressure increases.

4. A flow regulator comprising in combination a valve housing having inlet and outlet and a fluid passage connecting inlet and outlet, a port in said passage, a piston valve exposed to the force of flow and movable to throttle said port, a spring resisting the movement of said valve, a relatively large orifice in said valve upstream of said port for producing a relatively small pressure drop to produce a force to actuate said valve, an auxiliary passage by-passing said port and leading to said outlet, a relatively restricted orifice associated with said spring in said auxiliary passage down-stream of said relatively large orifice and by-passing a relatively small flow around said port to produce a supplemental pressure drop operative on said valve to increase the throttling movement of said valve.

5. A flow regulator for controlling the rate of fluid flow responsively to fluid pressure comprising in combination a housing having inlet and outlet and fluid passage connecting inlet and outlet, said passage having a port through which flow passes, a piston type valve in said passage movable responsively to fluid pressure for throttling said port to control flow, a metering orifice in said valve for producing a relatively small pressure drop for actuating said valve, an auxiliary passage by-passing said port, a restricted orifice in said valve admitting a small flow to said auxiliary passage and producing a substantial pressure drop acting on said piston valve to supplement the force thereon to increase its throttling action, and an adjustable port in said auxiliary passage to limit the maximum flow through said auxiliary passage.

6. A flow regulator for controlling the rate of fluid flow responsively to fluid pressure comprising in combination a valve housing having inlet and outlet and a fluid passage from inlet to outlet, said passage having a port, a piston throttling valve in said passage and having an orifice therein for creating a pressure drop to move said valve to throttle said port, a spring resisting movement of said valve, an auxiliary passage for by-passing flow around said port, and a restricted supplemental orifice in said valve admitting flow to said auxiliary passage and adapted to produce a supplemental pressure drop acting on said valve to increase its throttling action as fluid pressure increases, said supplemental orifice being restricted to limit flow therethrough and to increase the supplemental pressure drop at a greater rate than the aggregate rate of flow through both orifices.

References Cited in the file of this patent

UNITED STATES PATENTS

| | | |
|---|---|---|
| 942,360 | Wilkins | Dec. 7, 1909 |
| 1,907,162 | Webb | May 2, 1933 |
| 2,198,487 | Sisk | Apr. 23, 1940 |
| 2,224,216 | Coberly | Dec. 10, 1940 |
| 2,584,418 | Branson | Feb. 5, 1952 |
| 2,676,573 | Abbe | Apr. 27, 1954 |

FOREIGN PATENTS

| | | |
|---|---|---|
| 882,740 | France | 1943 |
| 332,451 | Germany | 1919 |

UNITED STATES PATENT OFFICE
CERTIFICATE OF CORRECTION

Patent No. 2,845,087                                          July 29, 1958

William W. Thomas

It is hereby certified that error appears in the printed specification of the above numbered patent requiring correction and that the said Letters Patent should read as corrected below.

Column 1, line 40, for "tightly" read -- lightly --.

Signed and sealed this 7th day of October 1958.

(SEAL)
Attest:

KARL H. AXLINE                                                ROBERT C. WATSON

Attesting Officer                                            Commissioner of Patents